Figure 1:
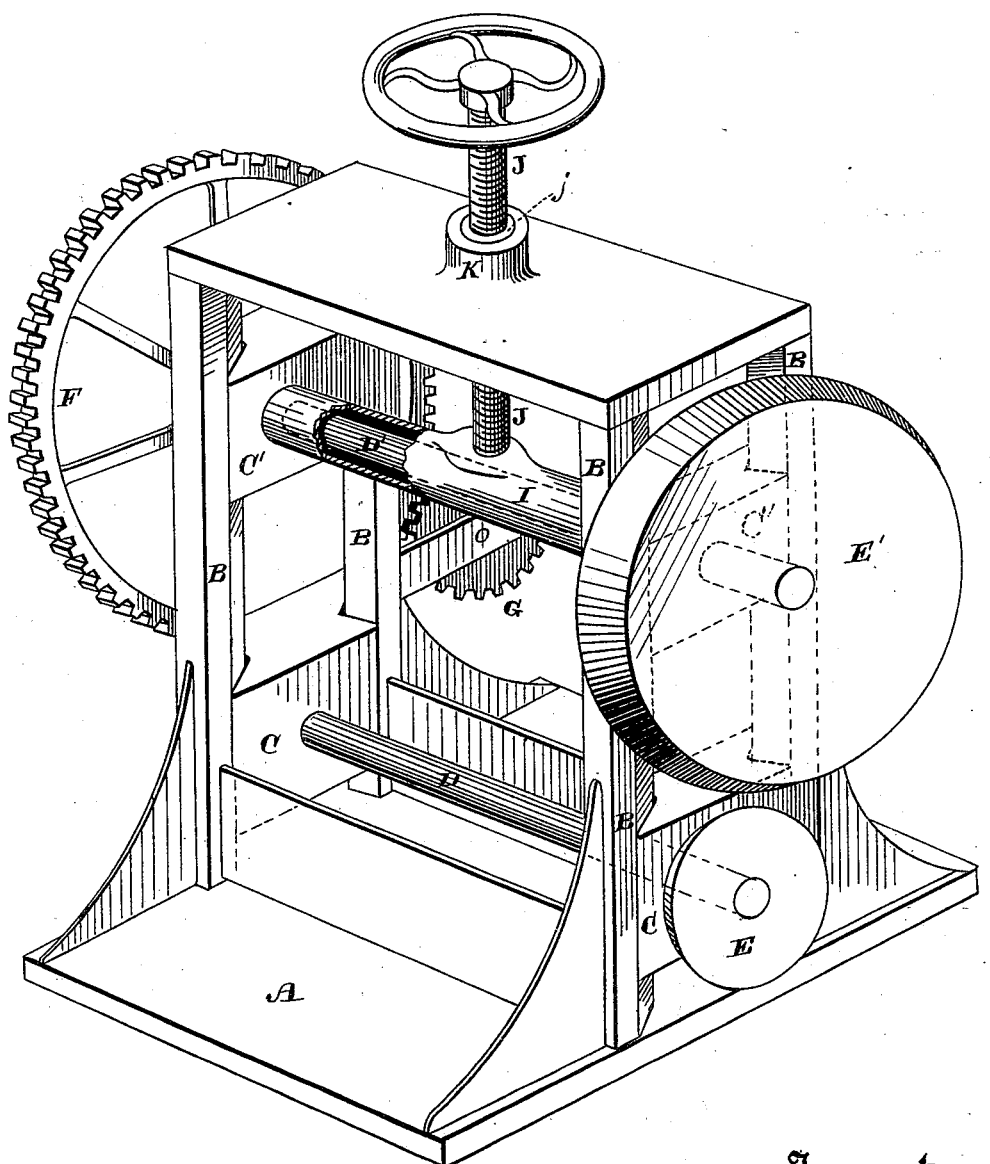

(No Model.) N. B. HERVEY. 2 Sheets—Sheet 1.
DEVICE FOR REMOVING TIRES.
No. 275,909. Patented Apr. 17, 1883.

Witnesses,
Geo. H. Strong
[signature]

Inventor
N. B. Hervey
By Dewey & Co.
Attorneys

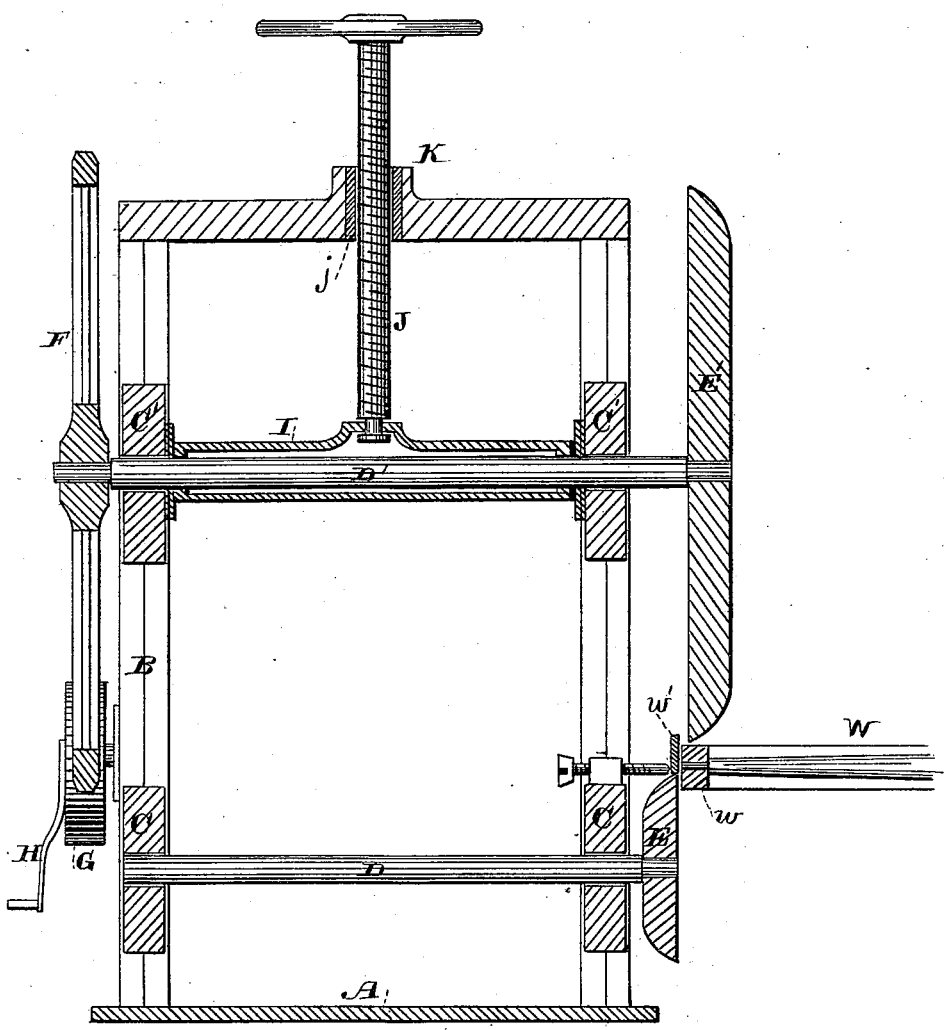

UNITED STATES PATENT OFFICE.

NELSON B. HERVEY, OF SANTA ROSA, CALIFORNIA.

DEVICE FOR REMOVING TIRES.

SPECIFICATION forming part of Letters Patent No. 275,909, dated April 17, 1883.

Application filed January 22, 1883. (No model.)

*To all whom it may concern:*

Be it known that I, NELSON B. HERVEY, of Santa Rosa, county of Sonoma, State of California, have invented an Improved Device for Removing Wheel-Tires; and I hereby declare the following to be a full, clear, and exact description thereof.

My invention relates to a new and useful device for removing tires from wheels; and it consists in a beveled disk or roller upon which the edge of the tire rests, and in a pressure-roller adapted to impinge upon and force down the felly of the wheel. Means for vertically adjusting said pressure-roller and causing it to rotate complete the invention, as will hereinafter fully appear.

The usual manner in which tires are removed is by hammering. This, besides being very laborious, sometimes splits the felly and otherwise injures the wheel.

The object of my invention is to remove the tire by a steady pressure applied in the most advantageous manner and with the exercise of small power.

Referring to the accompanying drawings, Figure 1 is a perspective view of my device. Fig. 2 is a vertical section, showing the wheel W applied to the device.

Let A represent a frame-work or foundation having uprights or guides B. Between these, at their bases, are blocks C, forming bearings for the shaft D, extending across the frame and carrying a disk or roller, E, on one end. This disk has an inwardly-beveled edge, as shown. In the guides B above are blocks C', which are adapted to be vertically adjusted therein. In these is journaled the shaft D', the ends of which project beyond the frame. One end carries a large roller, E', which lies just outside the vertical plane of the disk E, so that when the blocks C' are depressed the roller E' will pass by the outer edge of the disk E. The face of roller E' is beveled outwardly—that is, in a direction opposite to that of disk E. The other end of shaft D' carries a large gear, F, which meshes with a smaller driving-gear, G, to which a crank-handle, H, is secured. Thus revolution is imparted to the roller E'. In order to adjust it vertically I have a sleeve or box, I, secured between the blocks C', the shaft D' passing through it. To this box or sleeve is attached a screw, J, passing up through a threaded socket or nut, *j*, in a cap, K, and having a crank-wheel on top.

The application of this device for the purpose described is seen in Fig. 2, in which W represents the wheel having a felly, *w*, and a tire, *w'*.

Its operation is as follows: The wheel is laid horizontally, being journaled on a pivot through its hub. This I have not here shown, deeming it sufficient to show but a portion of the wheel. The machine is moved up so that the tire of the wheel shall rest upon the beveled edge of disk E. By means of the screw J the roller E' is then forced down upon the felly of the wheel and is gradually rotated. Sufficient pressure will finally force the felly down so as to free the tire, and the continued rotation of the pressure-roller and the travel of the wheel upon its center will bring the entire circumference of both felly and tire between the rollers of the machine, so that the tire will be removed all around.

Having thus described my invention, what I claim as new, and desire to secure by Letters Patent, is—

1. In a machine for removing the tires of wheels, the combination of the upper disk, E', mounted in vertically-moving bearings C', with the lower disk, E, mounted in fixed bearings C, so arranged that the interior face of the disk E' will barely escape the outer face of disk E in descending, as described, for the purpose set forth.

2. In a machine for removing the tires of wheels, the disk E, having an inwardly-beveled edge, and mounted to rotate in combination with the roller E', having an outwardly-beveled edge, said roller being above and beyond the vertical plane of disk E, means for rotating said roller, and means for vertically adjusting it, substantially as herein described.

3. In a machine for removing the tires of wheels, having a suitable frame and a beveled face disk, E, journaled therein, in combination with the pressure-roller E', the shaft D', upon which said roller is secured, the sliding bearing-blocks C', and means for rotating said shaft, and the sleeve or box I and screw J, as a means for adjusting said shaft and roller, all arranged and operating substantially as herein described.

4. In a machine for removing the tires of wheels, a frame, A, having vertical guides B, bearings C, shaft D, and beveled-face disk E, in combination with the sliding bearings C', upper shaft, D', and pressure-roller E' on said shaft, and the sleeve or box I, secured to bearings C', and the adjusting-screw J, all arranged and operating substantially as herein described.

In witness whereof I hereunto set my hand.

NELSON B. HERVEY.

Witnesses:
S. W. METCALF,
JOHN McMINN.